United States Patent
Hack et al.

(10) Patent No.: US 8,336,055 B2
(45) Date of Patent: Dec. 18, 2012

(54) DETERMINING THE STATUS OF VIRTUAL STORAGE IN THE FIRST MEMORY WITHIN THE FIRST OPERATING SYSTEM AND RESERVING RESOURCES FOR USE BY AUGMENTING OPERATING SYSTEM

(75) Inventors: Michel Henri Théodore Hack, Cortlandt Manor, NY (US); Stephen John Heisig, Tarrytown, NY (US); Joshua Wilson Knight, III, Mohegan Lake, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 12/046,840

(22) Filed: Mar. 12, 2008

(65) Prior Publication Data
US 2009/0235266 A1    Sep. 17, 2009

(51) Int. Cl.
*G06F 9/46* (2006.01)
(52) U.S. Cl. ............................ 718/104; 719/312
(58) Field of Classification Search .................. 718/102, 718/104; 719/312
See application file for complete search history.

(56) References Cited

U.S. PATENT DOCUMENTS

| | | | |
|---|---|---|---|
| 5,884,082 A * | 3/1999 | Seidel et al. | 717/128 |
| 6,349,407 B1 * | 2/2002 | Towfiq | 717/170 |
| 7,278,142 B2 * | 10/2007 | Bandhole et al. | 718/104 |
| 2004/0230794 A1 * | 11/2004 | England et al. | 713/164 |
| 2004/0260809 A1 | 12/2004 | Yodaiken | |
| 2005/0216722 A1 * | 9/2005 | Kim et al. | 713/2 |
| 2007/0028151 A1 | 2/2007 | Miller et al. | |

* cited by examiner

*Primary Examiner* — Jennifer N. To
*Assistant Examiner* — Abu Z Ghaffari
(74) *Attorney, Agent, or Firm* — F. Chau & Associates, LLC; Brian P. Verminski, Esq.

(57) ABSTRACT

A method for determining status of system resources in a computer system includes loading a first operating system into a first memory, wherein the first operating system discovers system resources and reserves a number of the system resources for use of an augmenting operating system, loading the augmenting operating system into a second memory reserved for the augmenting operating system by the first operating system, accessing the first memory from the augmenting operating system and obtaining data, running a process on the augmenting operating system to perform a computation using the data obtained from the first memory, and outputting the results of the computation using the system resources reserved for the augmenting operating system.

16 Claims, 5 Drawing Sheets

DETERMINING THE STATUS OF VIRTUAL STORAGE IN THE FIRST MEMORY WITHIN THE FIRST OPERATING SYSTEM AND RESERVING RESOURCES FOR USE BY AUGMENTING OPERATING SYSTEM

BACKGROUND OF THE INVENTION

1. Technical Field

The present disclosure relates to operating systems, and more particularly to monitoring operating systems.

2. Discussion of Related Art

In the area of operating system (OS) and application monitoring, typically monitoring software relies on an infrastructure of a production OS that is being monitored. When the OS is malfunctioning due to resource constraints, software errors, etc., the monitoring software cannot be relied on to run. At a time when it is most needed, monitoring software may not be functioning due to the same issues afflicting the monitored software.

Existing solutions and proposals for operating system (OS) and application monitoring can be divided into two categories. The first category requires separate partitions or machines. Separate partitions are resource intensive and increase a systems-management burden on administrators and increase technical complexity due to the inability to share virtual storage. Further, a limited number of partitions are available and there may not be enough to dedicate one partition to each production image.

The second category uses an agent or small amount of code resident on the monitored system to capture data that is sent to a separate server system. This agent code is subject to the problems occurring on the monitored system, and therefore, the agent may not run if the production OS is not functioning. The agent consumes computing resources, which may increase software licensing costs on the production OS. The agent itself may cause problems on the production OS by overlaying memory or looping. The agent code increases the dispatch latency of work on the production OS, since the agent typically runs at a high dispatching priority.

Further, monitoring products run in a privileged state and can damage OS structures if the monitoring software contains bugs.

Therefore, a need exists for systems and methods for monitoring of operating systems and applications that do not substantially increase the dispatch latency of work on the production OS.

SUMMARY OF THE INVENTION

According to an exemplary embodiment of the present invention, a method for determining status of system resources in a computer system includes loading a first operating system into a first memory, wherein the first operating system discovers system resources and reserves a number of the system resources for use of an augmenting operating system, loading the augmenting operating system into a second memory reserved for the augmenting operating system by the first operating system, accessing the first memory from the augmenting operating system and obtaining data, running a process on the augmenting operating system to perform a computation using the data obtained from the first memory, and outputting the results of the computation using the system resources reserved for the augmenting operating system.

According to an exemplary embodiment of the present invention, a computer readable medium tangibly embodies a program of instructions executable by a processor to perform method steps for determining status of system resources.

According to an exemplary embodiment of the present invention, a system for automatically determining status of system resources includes a memory system including a first memory and a second memory, wherein a first program code comprising a first operating system is loaded into the first memory, and a second program code comprising an augmenting operating system is loaded into the second memory, and a first and second processing unit in communication with the memory system, wherein the first and second processing units respectively execute the first and second program codes to implement method steps of discovering system resources and reserving a number of the system resources for use of the augmenting operating system, loading the augmenting operating system into the second memory reserved for the augmenting operating system by the first operating system, accessing the first memory from the augmenting operating system and obtaining data, running a process on the augmenting operating system to perform a computation using the data obtained from the first memory, and outputting the results of the computation using the system resources reserved for the augmenting operating system.

The present invention will become readily apparent to those of ordinary skill in the art when descriptions of exemplary embodiments thereof are read with reference to the accompanying drawings.

DESCRIPTION OF EXEMPLARY EMBODIMENTS

Hereinafter, exemplary embodiments of the present invention will be described with reference to the accompanying drawings.

Various exemplary embodiments of the present invention employ an augmenting operating system running in the same machine, virtual machine, or logical partition as the production operating system (OS). Using page tables of the production OS, the augmenting operating system can access virtual storage of the production OS, and can determine the status of resources, processes, and OS structures in the production OS independent of production OS software resources.

It is to be understood that the present invention may be implemented in various forms of hardware, software, firmware, special purpose processors, or a combination thereof. In one embodiment, the present invention may be implemented in software as a program tangibly embodied on a program storage device. The program may be uploaded to, and executed by, a computer system comprising any suitable architecture.

Figure 1:
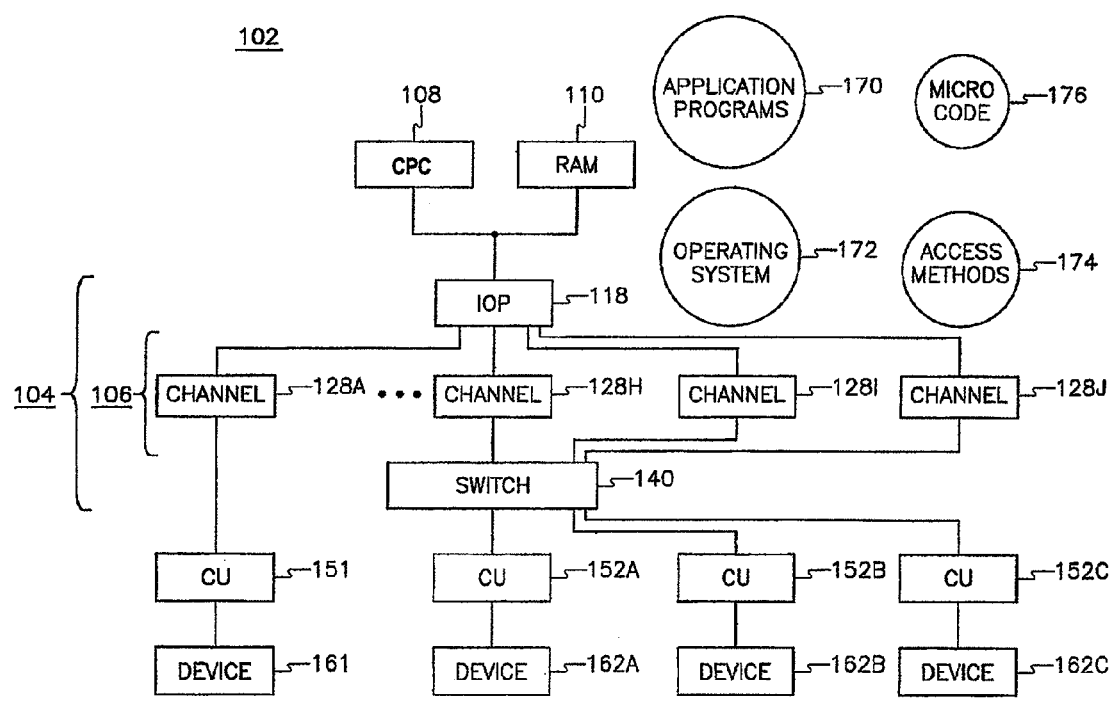
FIG. 1 is a block diagram of a data processing system, which may be used to implement an exemplary embodiment of the present invention.

Referring to FIG. 1, according to an embodiment of the present invention, a computer system 102 for implementing an operating system and an augmenting operating system can comprise, inter alia, a central processing complex (CPC) 108 with multiple processing units (PUs), a random access memory (RAM) 110, an input/output processor (IOP) 118, a channel subsystem 106 having multiple channels 128A through 128J, a switch 140, multiple control units (CUs) 151, 152A, 152B, 152C, and multiple peripheral devices 161, 162A, 162B, 162C. The general structure and operations of these components are well known. It will be appreciated that the hardware depicted in FIG. 1 may vary depending on the implementation.

For purposes of clarity, one peripheral device is shown connected to each CU in FIG. 1. It is to be understood that multiple peripheral devices may be connected to each CU 151, 152A, 152B and 152C.

The IOP 118, the channel subsystem 106, and the switch 140 are collectively called an input/output (IO) subsystem 104. The computer system 102 operates according to application programs 170, an operating system 172, access methods (or device drivers) 174, and microcode 176. The operating system 172 may be a secure, scalable, high-performance enterprise operating system on which Internet and Java-enabled applications can be built and deployed. In an exemplary implementation, the operating system 172 may be IBM's zSeries/Operating System (z/OS).

The devices 161, 162 communicate with the CPC 108 and the RAM 110 via physical paths. As shown in FIG. 1, a limited number of physical paths exist between the devices 162 and the CPC 108 (or equivalently, between the devices 162 and the RAM 110). Specifically, in this example, there are three physical paths between the devices 162 and the CPC 108. These physical paths include the channels 128H, 128I, 128J, the switch 140, and the CUs 152. For example, one of the physical paths from the device 162A and the CPC 108 includes the channel 128I, the switch 140 and the CU 152A.

In the computer system 102, the architecture, implementation and initialization limits placed on the devices 162 may restrict the use of all the channels 128H, 128I and 128J. For example, during initialization of the computer system 102, the IO subsystem 104 may be configured such that the devices 162 may use only the channels 128H and 128I for communication between the devices 162 and the CPC 108.

Figure 2:
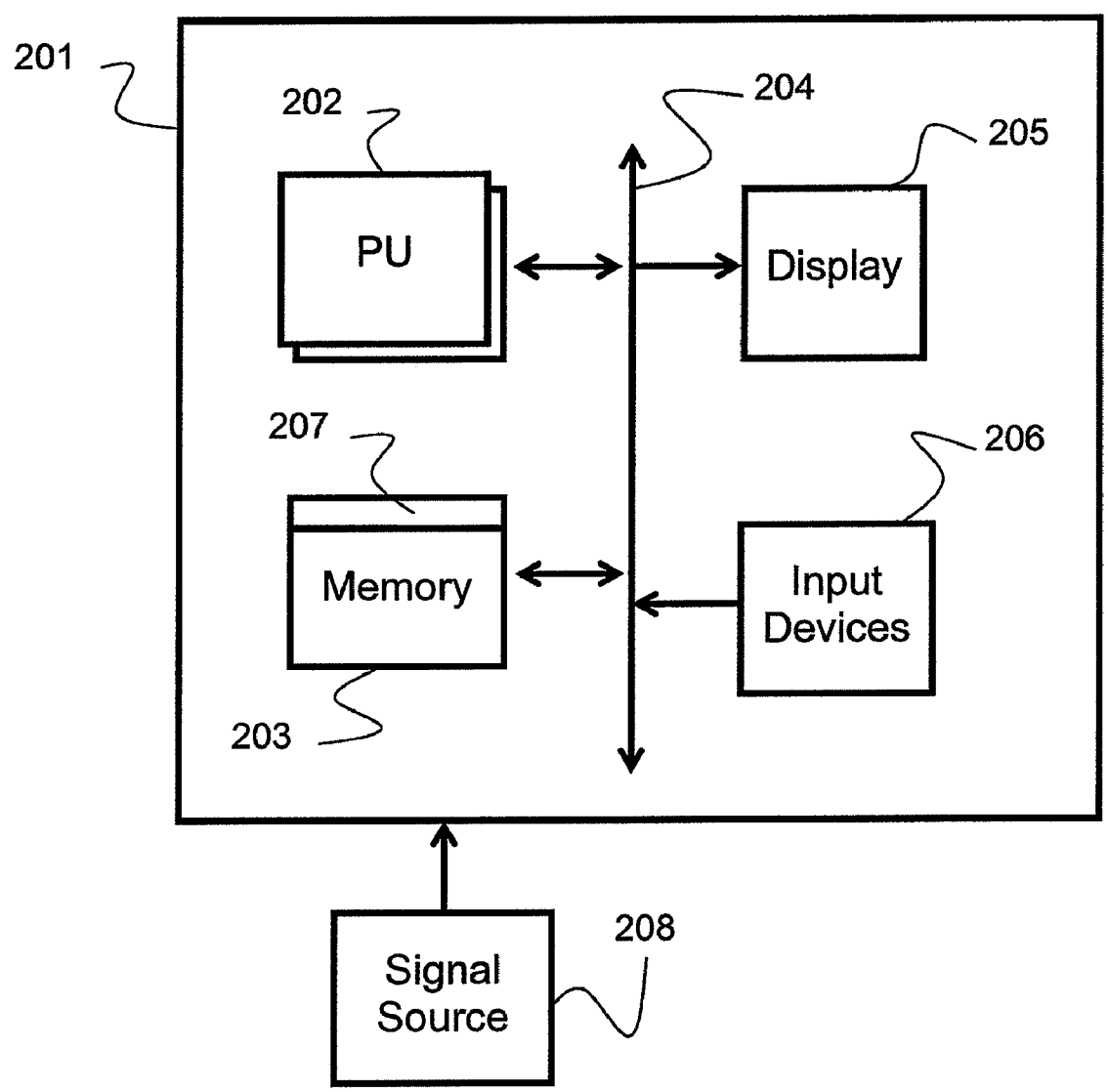
FIG. 2 is a block diagram of a data processing system, which may be used to implement an exemplary embodiment of the present invention.

Referring to FIG. 2, according to an embodiment of the present invention, a computer system 201 for implementing an operating system and an augmenting operating system can comprise, inter alia, a central processing complex (CPC) with multiple processing units (PUs) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the PUs 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof which is executed via the operating system. For example, the computer platform 201 may operate as described by IBM's z/Architecture Principles of Operation, SA22-7832-05. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

It will be appreciated that the hardware depicted in FIG. 2 may vary depending on the implementation. Other internal hardware or peripheral devices, such as flash memory, equivalent non-volatile memory, or optical disk drives and the like, may be used in addition to or in place of the depicted hardware.

It is to be understood that a program storage device can be any medium that can contain, store, communicate, propagate or transport a program of instructions for use by or in connection with an instruction execution system, apparatus or device. The medium can be, for example, an electronic, magnetic, optical, electromagnetic, infrared, or semiconductor system (or apparatus or device) or a propagation medium. Examples of a program storage device include a semiconductor or solid state memory, magnetic tape, removable computer diskettes, RAM (random access memory), ROM (read-only memory), rigid magnetic disks, and optical disks such as a CD-ROM, CD-RAN and DVD.

A data processing system suitable for storing and/or executing a program of instructions may include one or more processors coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution.

Figure 3:
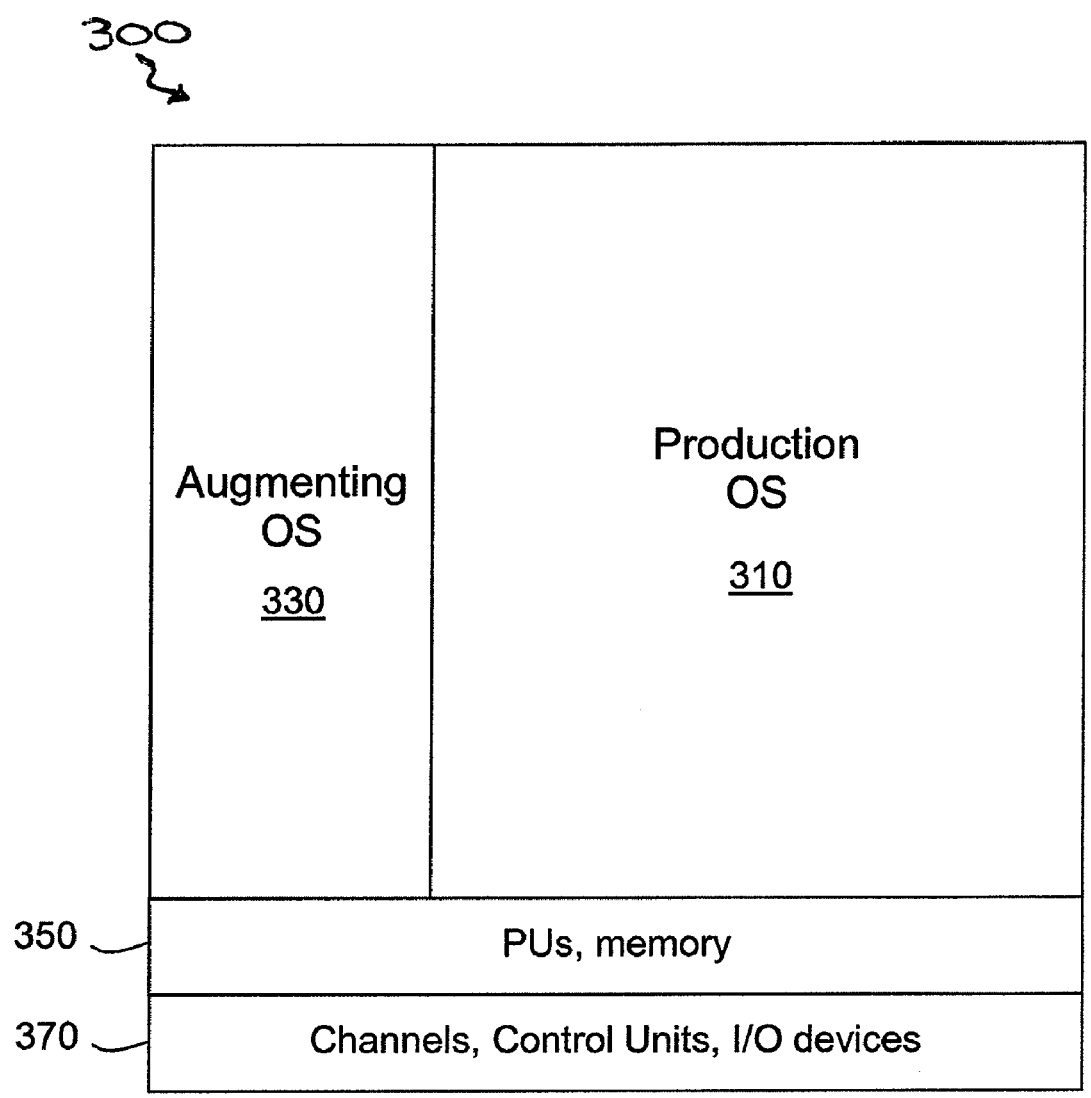
FIG. 3 is a block diagram schematically illustrating an architecture of a computing system with a production operating system and an augmenting operating system, according to an exemplary embodiment of the present invention.

FIG. 3 is a block diagram schematically illustrating an architecture of a computing system 300 with a production operating system and an augmenting operating system (OS), according to an exemplary embodiment of the present invention. Although the augmenting OS 330 may run in the same image, partition or machine as the production OS 310, the augmenting OS 330 does not rely on the real memory or processors used by the production OS 310.

The augmenting OS 330 may access the virtual memory in the production OS 310 by sharing translation lookaside buffer (TLB) hardware and may provide a read-only memory access service to the monitoring applications running on the augmenting OS 330. Even if the production OS 310 is malfunctioning, augmenting OS software 330 is capable of providing an answer about the state of the production OS 310.

In an exemplary embodiment of the present invention, the augmenting OS 330 can access virtual memory (by sharing the TLB hardware) rather than real memory and does not have to walk the page tables of the production OS 310 in software, thereby reducing complexity. The augmenting OS 330 can be packaged along with the production OS 310 so that the same tools and processes for maintaining and servicing the production OS 310 can be used for the augmenting OS 330. The monitoring code is designed to match the version of code running on the production OS 310; the monitoring code is designed to monitor specific versions of the production OS.

With the augmenting OS 330 in the same partition, the augmenting OS 330 can be loaded and started by the production OS 310 after its initial bringup. Even if the page tables of the production OS 310 are corrupted the augmenting OS 330 can trap the interrupt indicating a translation failure and return an indication of the problem. A current monitoring process may be moved to the augmenting OS 330, which may result in a performance benefit to the production system as those cycles would then not be damaging the latency of production applications. In a usage based pricing environment, removing those cycles may result in a cost savings, since they would no longer be increasing the license fees on software running on the production system. In an exemplary embodiment of the present invention, monitoring is run in the augmenting OS 330 using a read-only access method, and it may not be possible for such a monitoring process to corrupt the memory of the production system.

In an exemplary embodiment of the present invention, the production OS 310 is modified to leave some real memory unmapped and unallocated, one or more processors or processor units (PUs) offline, and a subset of devices masked off for use by the augmenting OS 330. After the production OS 310 is initialized, it loads the code used by the augmenting OS 330 into the real memory set aside for it. The reserved processor is pointed to the initialization sequence for the augmenting OS 330 and started. The augmenting OS 330 is modified to use only the real memory and processor 350, and I/O devices 370 left for it by the production OS.

The production OS 310 and the augmenting OS 330 use different I/O interruption subclasses so that interruptions for I/O completion by one will not be received as an interrupt on the other side. This process is illustrated schematically in FIG. 4.

Figure 4:
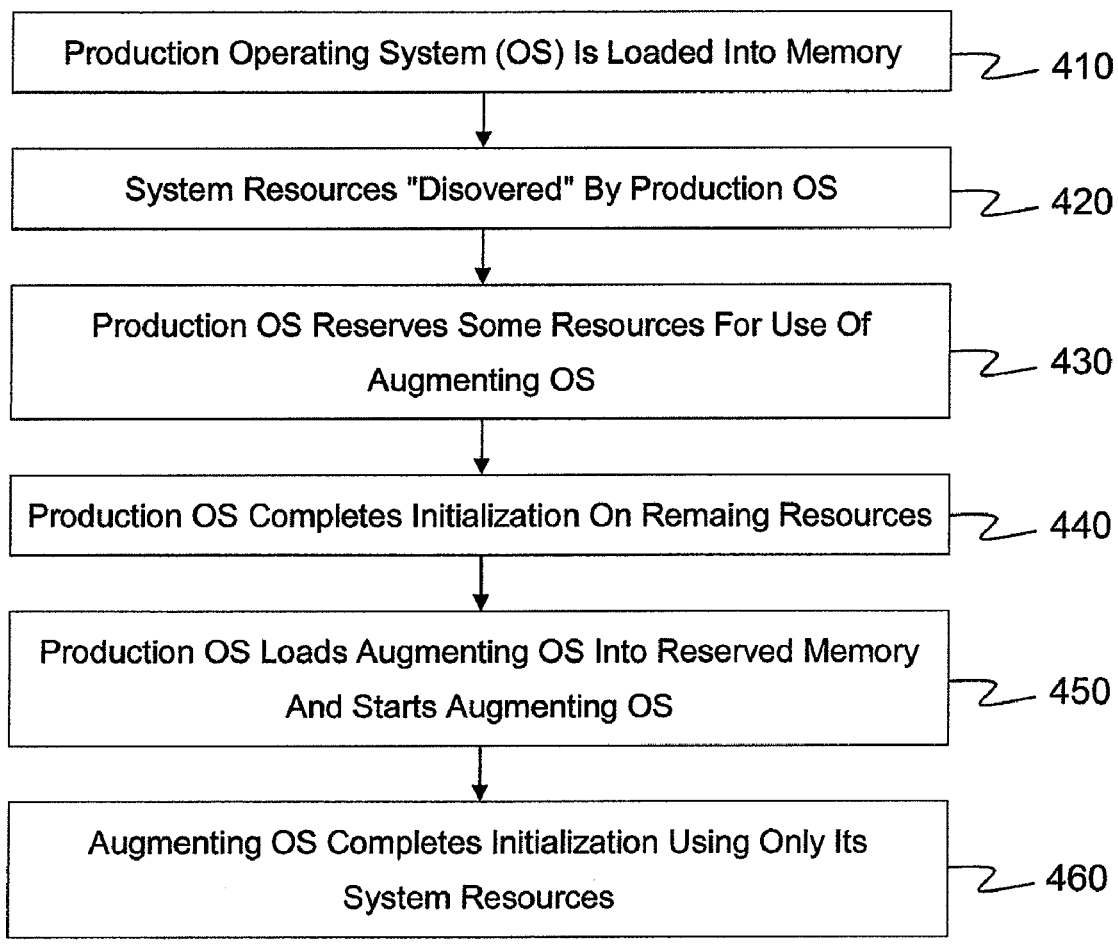
FIG. 4 is a flowchart illustrating an initialization sequence of a computing system, according to an exemplary embodiment of the present invention.

Referring to FIG. 4, in block 410, the production OS is loaded into memory. In block 420, the production OS discovers the resources (memory, I/O devices, etc.) available in a present configuration.

In block 430, the production OS reserves resources for the use of the augmenting OS. For example, the production OS may reserve at least one PU, a portion of memory and a subset of the I/O devices.

In block 440, the production OS completes its initialization sequence, using the remaining resources (PUs, memory and I/O devices).

Having initialized, the production OS loads the augmenting OS into the memory reserved for it and starts the augmenting OS, in block 450. For example, the code comprising the augmenting OS may be loaded from files resident in the production OS file system. The code versions in the augmenting OS and production OS may be synchronized and the augmenting OS can traverse in-memory data structures created and used by the OS. In an exemplary embodiment of the present invention, the code comprising the augmenting OS is maintained using the same mechanisms as the production OS, and the code versions in the augmenting OS and production OS may be kept in synchronization without becoming a systems-management burden on the systems administrators.

In block 460, the augmenting OS completes its initialization sequence using only the resources reserved for it. Once the production OS and the augmenting OS are up, the production OS can run its workload.

In various exemplary embodiments of the present invention, the augmenting OS hosts monitoring application software that uses a system service to examine production OS virtual storage to determine the status of system resources (memory, processor, IO devices) or structures (processes, work, recovery, etc.). The production OS may be the only entity that can resolve a page fault. The production OS can over commit real memory (110 in FIG. 1, 203 in FIG. 2) so that a process that is running on the OS operates as if it has memory that is not actually present in real memory (110, 203). For example, when the application tries to use this memory the production OS transfers any data from external devices (161, 162a, 162b, 162c in FIG. 1, 206 in FIG. 2) to real memory (110, 203) to maintain the illusion that the data is in real memory (110, 203).

In an exemplary embodiment of the present invention, altering production OS pages that are non-resident (i.e., not present in real memory) will result in an interrupt that is caught in the augmenting OS and returned as an error to the application. In an exemplary embodiment of the present invention, the page-in operations cannot be triggered for production OS pages from the augmenting OS and therefore these pages will be unavailable to it. Also, services that generate floating interrupts (i.e., interrupts that may be delivered to any PU in the machine) will be not be issued by the augmenting OS and will be masked off on the augmenting OS so that production OS requests will not be fielded by the one or more processors or cores running the augmenting OS.

Applications running on the augmenting OS may communicate with users via sockets on their own devices. In a computing system with a production OS and an augmenting operating system, according to exemplary embodiments of the present invention, if the production OS has problems with its communication stack (e.g., TCP/IP crash), runs out of paging storage or real frames, is paralyzed by locking problems, has its processors go into spin loops or any other software-related issues, the augmenting OS will still be able to access the virtual memory of the production OS to diagnose and communicate the problems to administrators.

Figure 5:
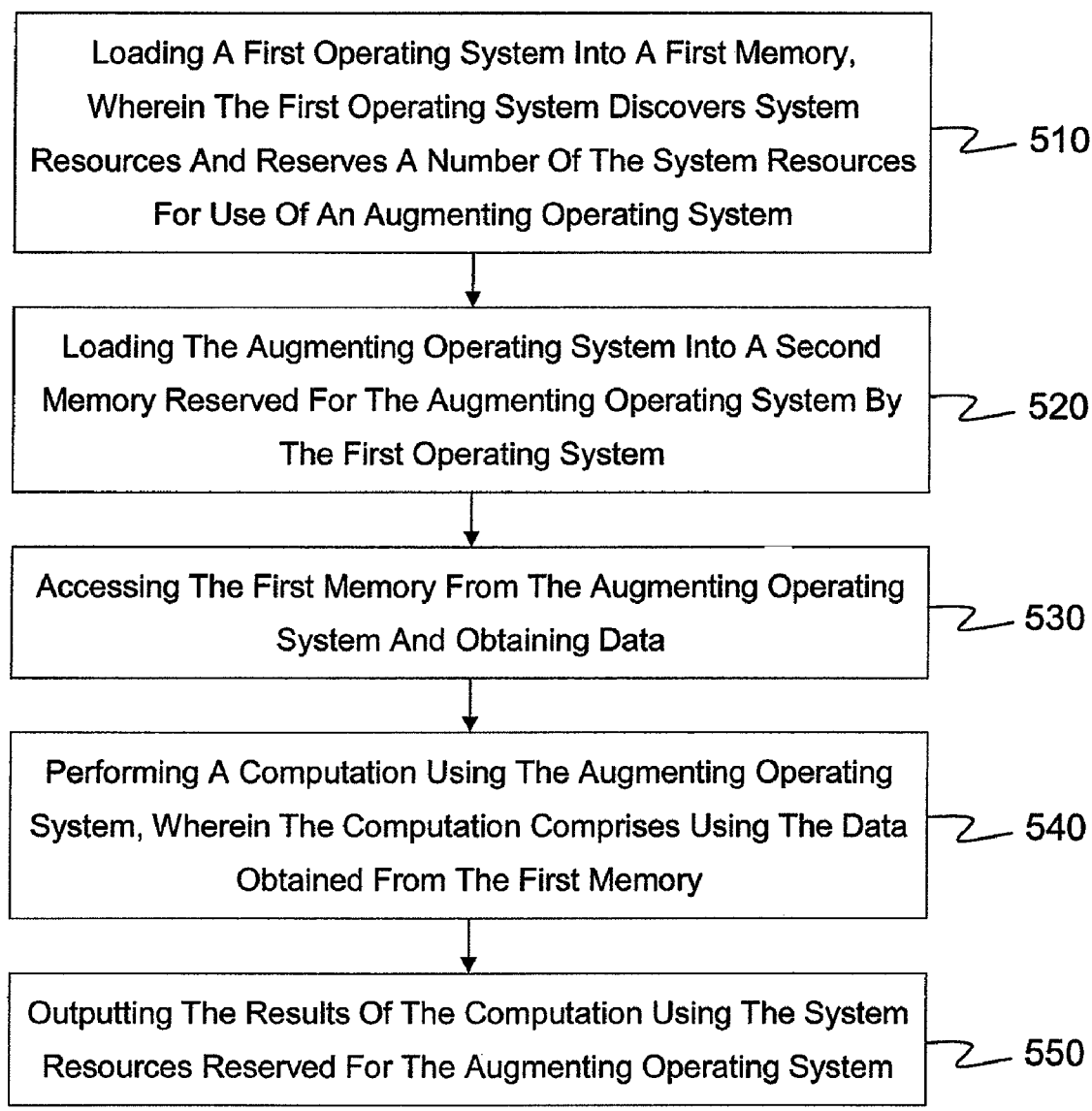
FIG. 5 is a flowchart illustrating a method for determining status of system resources in a computer system, according to an exemplary embodiment of the present invention.

FIG. 5 illustrates a method for determining status of system resources in a computer system, according to an exemplary embodiment of the present invention, whereby an augmenting OS can determine the status of system resources independent of production OS software resources.

Referring to FIG. 5, in block 510, a first OS is loaded into a first memory, wherein the first OS discovers system resources and reserves a number of the system resources for use of an augmenting OS. For example, the first OS may reserve at least one PU, a portion of memory and a number of I/O devices for the use of the augmenting OS.

In block 520, the augmenting OS is loaded into a second memory reserved for the augmenting OS by the first OS. The first OS and the augmenting OS may be loaded into a same logical partition. Computer readable program code embodying the augmenting OS may be loaded from files resident in a file system of the first OS. Computer readable program code embodying the augmenting OS may be maintained using substantially the same mechanisms as the first OS.

The augmenting OS may run in the same machine, virtual machine, or logical partition as the first OS. In an exemplary embodiment of the present invention, the augmenting OS hosts application software that uses a system service to examine virtual storage of the first OS to determine the status of the system resources. The system resources may include processes and OS structures in the production OS.

In block 530, the first memory is accessed from the augmenting operating system and data is obtained from the first memory. For example, the first memory may be accessed from the augmenting operating system using a read-only access method. The augmenting operating system may access the virtual storage of the first OS using the page tables of the first OS.

In block 540, a computation is performed using the augmenting operating system. The computation may include using the data obtained from the first memory.

In block 550, the results of the computation are outputted using the system resources reserved for the augmenting operating system. Outputting the results of the computation may include communicating the results to other computer system(s).

According to an exemplary embodiment of the present invention, a computer readable medium tangibly embodies a program of instructions executable by a processor to perform method steps for determining status of system resources.

Although exemplary embodiments of the present invention have been described in detail with reference to the accompanying drawings for the purpose of illustration and description, it is to be understood that the inventive processes and apparatus are not to be construed as limited thereby. It will be apparent to those of ordinary skill in the art that various modifications to exemplary embodiments may be made without departing from the scope of the invention as defined by the appended claims, with equivalents of the claims to be included therein.

What is claimed is:

1. A method for determining status of system resources in a computer system, comprising:
    loading a first operating system into a first memory of the computer system, wherein the first operating system discovers a plurality of system resources of a first computing system and reserves a number of the system resources for use by an augmenting operating system;
    loading the augmenting operating system into a second memory of the computer system reserved for the augmenting operating system by the first operating system;
    accessing the first memory from the augmenting operating system and obtaining data;
    performing a computation using the augmenting operating system, wherein the computation comprises using the data obtained from the first memory; and
    outputting the results of the computation using the system resources reserved for the augmenting operating system,
    wherein the augmenting operating system hosts application software that uses a system service to examine a virtual storage of the first operating system to determine the status of the system resources of the first operating system, wherein the first memory includes the virtual storage.

2. The method of claim 1, wherein the first operating system and the augmenting operating system are loaded into a same logical partition.

3. The method of claim 1, wherein accessing the first memory from the augmenting operating system comprises using a read-only access method.

4. The method of claim 1, wherein the first operating system reserves at least one processing unit, a portion of memory and a number of input/output devices for the use of the augmenting operating system.

5. The method of claim 1, wherein program code comprising the augmenting operating system is loaded from files resident in a file system of the first operating system.

6. The method of claim 1, wherein program code comprising the augmenting operating system is maintained using the same mechanisms as the first operating system.

7. The method of claim 1, wherein outputting the results of the computation comprises communicating the results to a different computer system.

8. A system for automatically determining status of system resources, comprising:
    a memory system including a first memory and a second memory, wherein a first program code comprising a first operating system is loaded into the first memory, and a second program code comprising an augmenting operating system is loaded into the second memory; and
    a first and second processing unit in communication with the memory system, wherein the first and second processing units respectively execute the first and second program codes to implement method steps of:
    discovering a plurality of system resources and reserving a number of the system resources for use by the augmenting operating system;
    loading the augmenting operating system into the second memory reserved for the augmenting operating system by the first operating system;
    accessing the first memory from the augmenting operating system and obtaining data;
    running a process on the augmenting operating system to perform a computation using the data obtained from the first memory; and
    outputting the results of the computation using the system resources reserved for the augmenting operating system,
    wherein the augmenting operating system hosts application software that uses a system service to examine a virtual storage of the first operating system to determine the status of the system resources of the first operating system, wherein the first memory includes the virtual storage.

9. The system of claim 8, wherein the first operating system reserves the second processing unit and a number of input/output devices for the use of the augmenting operating system.

10. The system of claim 9, wherein the augmenting operating system operates independently of the first memory and the first processing unit.

11. The system of claim 9, wherein the second program code comprising the augmenting operating system is loaded from files resident in a file system of the first operating system.

12. The system of claim 9, wherein the second program code comprising the augmenting operating system is maintained using the same mechanisms as the first operating system.

13. A non-transitory computer readable medium, tangibly embodying a program of instructions executable by a processor to perform method steps for determining status of system resources, the computer readable medium comprising:
    instructions for loading a first operating system into a first memory of a computer system including the processor, wherein the first operating system discovers a plurality of system resources and reserves a number of the system resources for use by an augmenting operating system;
    instructions for loading the augmenting operating system into a second memory of the computer system reserved for the augmenting operating system by the first operating system;
    instructions for accessing the first memory from the augmenting operating system and obtaining data;
    instructions for performing a computation using the augmenting operating system, wherein the computation comprises using the data obtained from the first memory; and instructions for outputting the results of the computation using the system resources reserved for the augmenting operating system, wherein the augmenting operating system hosts application software that uses a system service to examine a virtual storage of the first operating system to determine the status of the system resources of the first operating system, wherein the first memory includes the virtual storage.

14. The method of claim 1, wherein reserving the number of the system resources for use of the augmenting operating system comprises:

reserving, by the first operating system a portion of a real memory as unmapped and unallocated for the independent use of the augmenting operating system; and reserving at least one processor for the independent use of the augmenting operating system.

15. The system of claim 8, wherein reserving the number of the system resources for use of the augmenting operating system comprises:

reserving, by the first operating system a portion of a real memory as unmapped and unallocated for the independent use of the augmenting operating system; and reserving at least one processor for the independent use of the augmenting operating system.

16. The computer readable medium of claim 13, wherein reserving the number of the system resources for use of the augmenting operating system comprises:

reserving, by the first operating system a portion of a real memory as unmapped and unallocated for the independent use of the augmenting operating system; and reserving at least one processor for the independent use of the augmenting operating system.

* * * * *